United States Patent [19]

Barbin

[11] 3,916,437

[45] Oct. 28, 1975

[54] PURITY ADJUSTMENT FOR COLOR DISPLAY SYSTEM

[75] Inventor: Robert Lloyd Barbin, Lancaster, Pa.

[73] Assignee: RCA Corporation, New York, N.Y.

[22] Filed: June 10, 1974

[21] Appl. No.: 477,888

[52] U.S. Cl. ................ 358/10; 178/DIG. 4; 358/68

[51] Int. Cl.$^2$ ........................ H04N 9/62; H04N 9/24

[58] Field of Search ............. 358/10, 64, 68, 66, 74, 358/72; 178/DIG. 4; 335/212, 213; 315/13 C, 13 CG

[56] References Cited

UNITED STATES PATENTS

| | | | |
|---|---|---|---|
| 3,586,755 | 6/1971 | Wlasuk | 358/10 |
| 3,818,395 | 6/1974 | Anthony et al. | 325/212 |

*Primary Examiner*—Robert L. Griffin
*Assistant Examiner*—R. John Godfrey
*Attorney, Agent, or Firm*—E. M. Whitacre; P. J. Rasmussen

[57] ABSTRACT

Auxiliary deflection coils spaced on opposite sides of a multi-beam color picture tube are energized by scanning current at a multiple of the normal scanning rate so a series of bars appears on the viewing screen. The two outside beams are biased off and the bar pattern formed is then a series of sequential bars of the remaining color beam separated by alternate color bars of the two biased off beams. Purity tolerance is then adjusted while the operator watches for equal intensities of the two separated alternate color bars.

5 Claims, 10 Drawing Figures

PURITY ADJUSTMENT FOR COLOR DISPLAY SYSTEM

BACKGROUND OF THE INVENTION

This invention relates to a method and apparatus for adjusting the color purity of a display on a color picture tube.

The three beams of a color television picture tube must be adjusted in position for several reasons to enable a satisfactory picture to be reproduced on the viewing screen of the tube. Adjustment for color purity is required with all color picture tubes. The purity adjustment provides for the beams to land only on their respective color phosphor elements. Obviously, if the displayed picture lacked purity the red beam, for example, might land on green or blue phosphors and result in a false color scene reproduction. In a non-matrix type of color picture tube, the beam portion passing through an aperture of the shadow mask is smaller than the individual phosphor elements on the viewing screen so that when it is properly landed on the desired phosphor element it will not illuminate the adjacent different color elements. In a matrix type of picture tube in which dark guard bands separate adjacent different color phosphor elements, the beam portion passing through an aperture may be larger than the phosphor element and still result in color purity. In both types of picture tubes it is desirable to center the respective beams on their phosphor elements to minimize the possibility of a loss of purity if the beams are undesirably moved due to temperature changes of the picture tube or stray magnetic fields. The distance between an edge of a beam and the adjacent different color phosphor is called purity tolerance. To this end, it is generally recognized that purity may be controlled at the center portion of a viewing screen by varying the position of two magnetized purity rings mounted for rotatable motion about the neck of the picture tube. Purity is adjusted at the edge regions of the picture tube by axial movement of the deflection yoke which moves the deflection center of the beams and hence controls their landing position at portions away from the center of the viewing screen.

Beam landing on the phosphor elements of a viewing screen may be observed by viewing the screen with the aid of a microscope. Any purity errors, or clipping, can thereby be readily observed and the purity adjustments may then be made to correct any clipping condition. Such a procedure is well suited for laboratory work; however, it is too time consuming for use on an assembly line where purity is normally adjusted. On the assembly line one common arrangement for setting purity is to bias off two of the three color beams and observe the color of the viewing screen. With only the red beam on, for example, ideally the viewing screen would display a pure red field. To this end the purity rings around the neck of the tube would be rotated to achieve a red field in the center portion of the viewing screen and the deflection yoke would be moved to achieve a red field at all other portions of the viewing screen. As a practical matter, such adjustments are very subjective in nature as it is difficult to tell quickly whether the exact desired shade of red is displayed because various colors border the center region as the rings are adjusted and various colors appear in moving patterns around the viewing screen edge portions as the deflection yoke is moved. Utilizing this method of setting purity, even if a red field were obtained there would be no way of knowing if the purity tolerance of the red beam from clipping blue and green phosphor elements was equal, i.e., whether the red beam was centered on the red phosphor elements. Thus, even though purity was obtained, it could represent only a marginal condition which could be upset by temperature changes or stray magnetic fields.

In accordance with the invention, a method of adjusting color purity of a multi-beam color picture tube comprises the steps of placing a deflection yoke and color purity adjustment apparatus in operating positions relative to the color picture tube and operated for causing a raster to be scanned on the viewing screen of the picture tube. A set of auxiliary deflection coils are placed on opposite sides of the picture tube and energized with scanning current having a frequency for producing a bar pattern on the viewing screen. First and second of the three beams of the picture tube are cut off and the color purity apparatus and position of the yoke are adjusted for producing bar patterns of a series of third color bars corresponding to the third beam interleaved by alternate equal intensity bars of first and second colors corresponding to the colors normally produced by the cut off first and second beams.

Also, apparatus for accomplishing the above stated method is provided in accordance with the invention.

A more detailed explanation of the invention is given in the following specification and accompanying drawings of which:

DETAILED DESCRIPTION OF THE INVENTION

Figure 1:
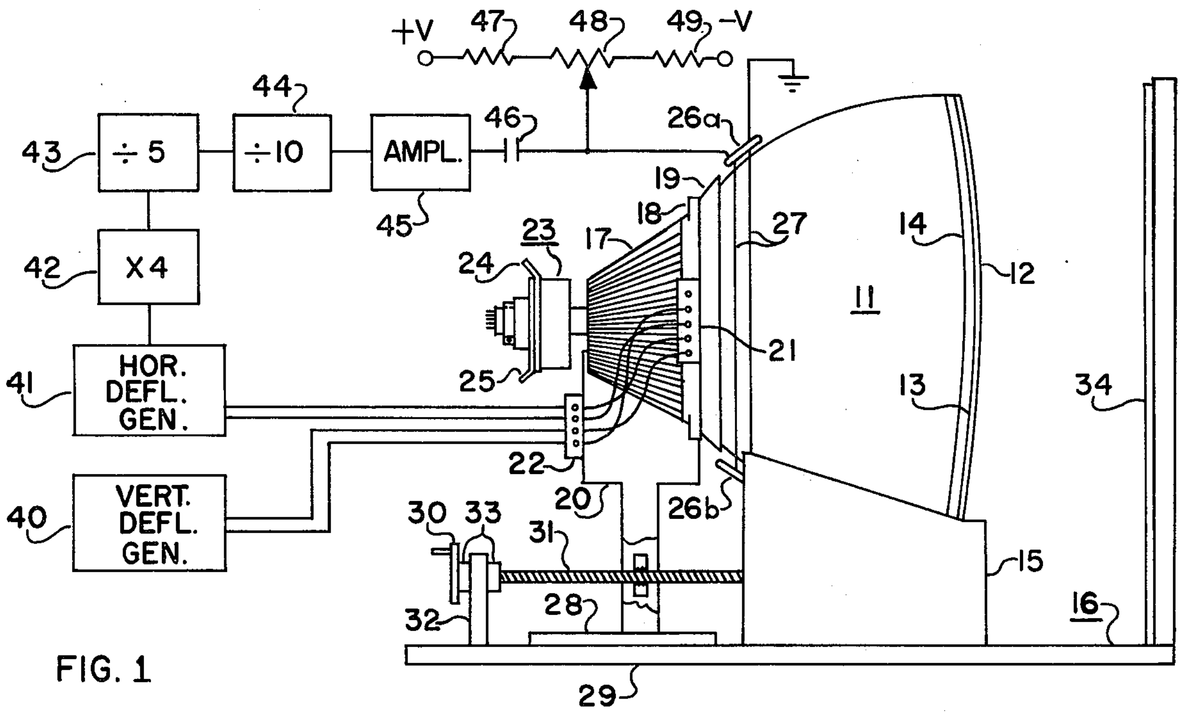
FIG. 1 is a combined side elevation view and functional block diagram of a system for adjusting color purity in accordance with the invention.

FIG. 1 is a combined side elevation view and functional block diagram of a system for adjusting color purity in accordance with the invention. A picture tube mounting assembly 16 includes a horizontal base member 29 and at one end thereof a vertical member including a mirror surface 34. Mounted on base member 29 is a picture tube mounting fixture 15 for supporting picture tube 11 with its faceplate 12 directed toward mirror plate 34 so that the viewing screen may be viewed from the back of the picture tube during operation. On the inside surface of viewing screen 12 are a plurality of different colored phosphor elements 13. An aperture mask 14 is spaced a relatively short distance to the rear of phosphor elements 13 for allowing portions of the picture tube electron beams to pass through the apertures to strike their respective color phosphor elements. A deflection yoke 17 comprising horizontal and vertical deflection coils is fixed to a mounting member 18 which in turn is fitted against a mounting member 19 which is fixedly attached to the glass envelope of picture tube 11. The mounting members are selected to allow for relative motion between the deflection yoke 17-mounting member 18 and mounting member 19. Any suitable arrangement for securing member 18 to member 19 when satisfactory position is achieved may be utilized. A static convergence assembly 23 is mounted about the neck portion of picture tube 11 to the rear of deflection yoke 17. Static convergence member 23, which may be of a known type, is utilized to converge the red, green and blue electron beams of the picture tube in the center region of viewing screen 12. To the rear of static convergence assembly 23 are disposed a pair of color purity adjusting rings 24 and 25. These rings are magnetized across a diameter of each ring so that rotation of the rings about the neck of picture tube 11 will cause the three electron beams to move in the same direction.

A deflection yoke retaining member 20 is mounted on a base plate 28 which in turn is slideably movable with respect to base plate member 29. Member 20 supports the deflection yoke 17. Member 20 is moved left and right in a horizontal direction by means of a screw member 31 which engages with threads within member 20. Screw member 31 passes through a vertical member 32 affixed to base plate member 29 and is held in relation to member 32 by two collars 33. A handle 30 is affixed to the end of screw member 31 so that it may be turned easily. It can be seen that turning of handle 30 will cause yoke supporting member 20 and deflection yoke 17 to be moved horizontally along the central longitudinal axis of picture tube 11.

Disposed about top and bottom portions of picture tube 11 and mounted to member 15 are a pair of auxiliary deflection coils 26*a* and 26*b*. Electrical connections on a terminal board 21 to which the deflection coil windings are connected are routed to a terminal board 22 on member 20. A vertical deflection generator 40 provides scanning current at the vertical deflection rate and is coupled to terminal board 22 for energizing the vertical deflection coils. A horizontal deflection generator 41 provides scanning current at a horizontal deflection rate and is coupled to terminal board 22 for providing scanning current for the horizontal deflection coils. Energy at the horizontal deflection rate is coupled to a 4X multiplier 42. The signals obtained from multiplier 42 are coupled to a divide-by-five circuit 43. Signals from circuit 43 are coupled to a divide-by-ten stage 44. Signals obtained from divide-by-ten stage 44, which have a 1,260 Hz frequency for a deflection generator operating at approximately 15,750, are coupled to an amplifier 45. The amplified signals are AC coupled through a capacitor 46 to energize auxiliary deflection coils 26*a* and 26*b*. Coils 26*a* and 26*b*, which may be connected in series, have their other terminal coupled to ground. A voltage divider including series coupled resistor 47, potentiometer 48, and resistor 49 is coupled between positive and negative sources of voltage +V and −V, respectively. The wiper arm of potentiometer 48 is coupled to deflection coils 26*a* and 26*b*. Adjustment of potentiometer 48 varies the polarity and magnitude of direct current through coils 26*a* and 26*b* and may be utilized to statically shift the magnetic field produced by the coils.

Figure 2:
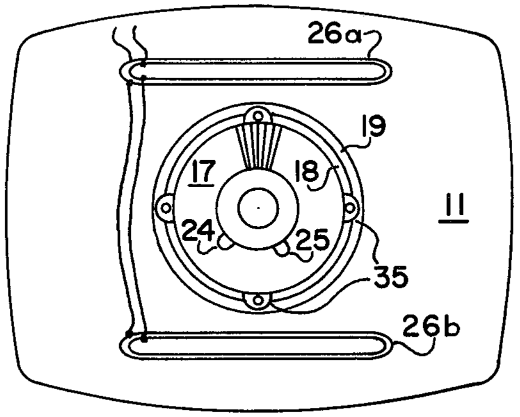
FIG. 2 is a partial rear view of FIG. 1 showing the operating relation of auxiliary deflection coils relative to a color picture tube in an arrangement for practicing the invention.

FIG. 2 is a partial rear view of FIG. 1 showing the operating relation of auxiliary deflection coils 26*a* and 26*b* relative to color picture tube 11. It can be seen that coils 26*a* and 26*b* extend in horizontal directions on opposite portions of the funnel portion of picture tube 11. When energized, these deflection coils produce a vertical magnetic field which serves to shift the electron beams of picture tube 11 in horizontal directions. The scanning current, which is AC coupled to coils 26*a* and 26*b*, produces a magnetic field which alternately shifts the beams to the left and the right. The magnetic field produced by coils 26*a* and 26*b* is in addition to the normal deflection field produced by the deflection coils of deflection yoke 17. It is noted that the frequency of excitation of coils 26*a* and 26*b* is selected to be a multiple of the vertical scanning rate which is in this embodiment 60 cycles. In this manner, there is produced a pattern of horizontal bars across the face of the viewing screen of picture tube 11, which bars are produced as a result of magnetic fields rather than the application of video signals.

Figure 3:
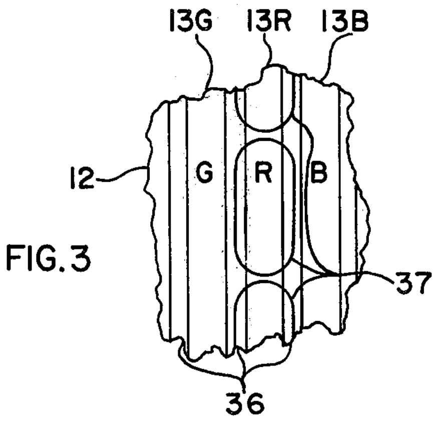
FIG. 3 illustrates a color purity condition of an electron beam and its corresponding color phosphor element.

FIG. 3 illustrates a color purity condition of an electron beam and its corresponding phosphor element. An electron beam 37, which emanates from an electron gun and is projected through the aperture mask of the picture tube and which is intended to strike only red color phosphor elements, is shown landing centered about a red phosphor element 13R of a screen 12. The viewing screen illustrated contains phosphor elements disposed in vertical stripes such that a repeating pattern of green, red and blue phosphor elements 13G, 13R and 13B are formed. Such a screen is suitable for use with a picture tube having three coplanar horizontal beams. The viewing screen contains black stripes 36 disposed between the phosphor elements for forming a viewing screen of the matrix type. As discussed earlier, it is desirable to have the beam portion 37 centered about its corresponding color phosphor element 13R. Such a condition would result in color purity with no clipping of the different color phosphor elements by the red beam portion 37. It is noted that the separated beam portions 37 in a vertical direction are caused by horizontal webs in the aperture mask 14 structure.

Figure 4:
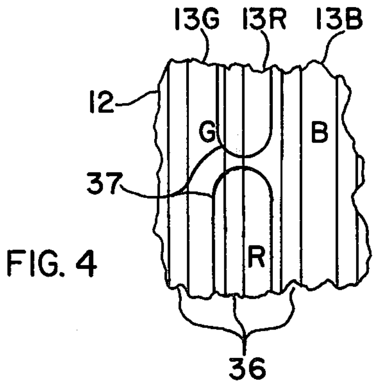
FIG. 4 illustrates a clipping condition of an electron beam relative to its corresponding color phosphor element.

FIG. 4 illustrates a clipping condition of the red electron beam 37. In this figure it can be seen that a purity error exists which results in the red beam 37 landing outside of its intended landing area, crossing the matrix stripe 36 and exciting a portion of the green phosphor element 13G. Thus, in FIG. 4 an undesirable green clipping condition caused by the red beam exists. It should be understood that when this type of clipping condition exists, a scene which would normally contain for example, only red colors, would be reproduced as having the red color undesirably diluted with some green.

It is the conventional purpose of the rotational adjustment of color purity rings 24 and 25 and the axial movement of deflection yoke 17 to correct for the clipping condition illustrated in FIG. 4 for producing a desired color purity condition illustrated in FIG. 3.

Figure 5:
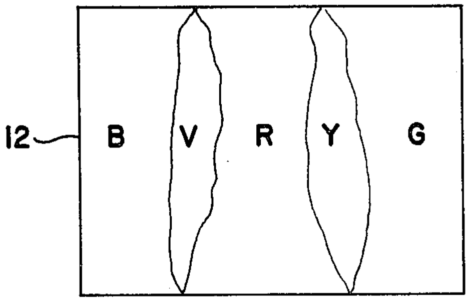
FIGS. 5 and 6 illustrate conditions of color purity errors as observed when adjusting purity utilizing prior art techniques.

FIG. 5 illustrates a condition of color purity as observed when adjusting purity utilizing prior art techniques. The pattern of FIG. 5 may be observed when operating the apparatus of FIG. 1 without utilizing coils 26*a* and 26*b*. With suitable biasing potentials applied to the picture tube for biasing off the blue and green electron guns, only the red electron beam scans the viewing screen and ideally only a red field should be observed. However, it is to be expected when initially adjusting the neck components of the picture tube that a pure red field will not be present. The purity rings are adjusted by rotating them around the neck of the picture tube to obtain a red field in the center of the viewing screen 12, as illustrated in FIG. 5. Rotation of the rings causes different colors to appear away from the center of the viewing screen. As illustrated, these colors may be violet on one side and yellow on the other. Further, the left and right edge regions may be of still different colors such as blue and green, as illustrated. As these colors change and as their position changes on the viewing screen, it becomes somewhat difficult or at least subjective to determine when the center portion of the screen is the desired red color. As mentioned previously, even when a red field is obtained there is no way of knowing whether the red beam is actually centered about the red phosphor elements or whether there is just marginal purity tolerance.

Figure 6:
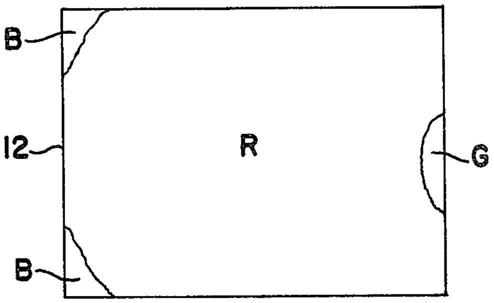

Utilizing the prior art color purity adjusting arrangement and once the center of the viewing screen has been adjusted for color purity, the deflection yoke is then moved axially relative to the picture tube such as by rotating handwheel 30 of FIG. 1 to obtain color purity in the edge regions of the picture tube. Such a condition is illustrated in FIG. 6. It can be seen in FIG. 6 that most of the viewing screen 12 is of the desired red color. However, there may be different color portions at various positions around the edge regions as illustrated by the blue and green portions. Again, it is quite subjective as to when the best red field is obtained because the different colors around the edge regions will shift in position and in color saturation as the yoke is moved. The end result is that it is quite easy for the purity adjustment to be finished without obtaining the maximum purity tolerance which is desired so the tube may display proper colors while undergoing temperature variations and while subjected to stray magnetic fields, either of which could cause marginally adjusted beams to clip different color phosphor elements.

Figure 7:
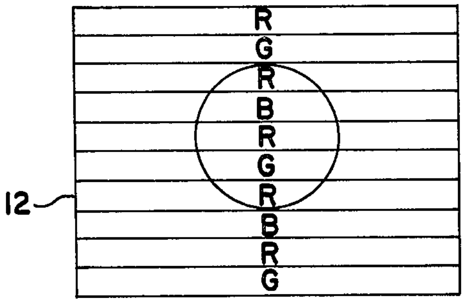
FIGS. 7, 8 and 9 illustrate various conditions of color purity as observed when adjusting purity in accordance with the present invention.
Figure 8:
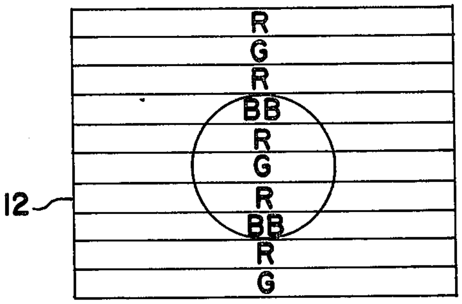
Figure 9:
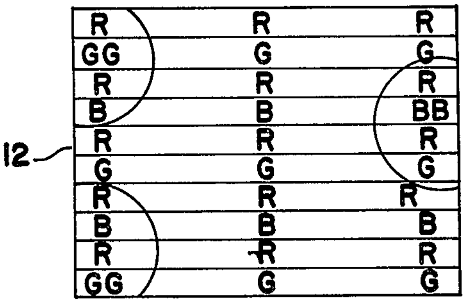

FIG. 7 illustrates a condition of color purity as observed while adjusting purity in accordance with the invention. It can be seen that a bar pattern comprising red stripes interleaved by alternating blue and green stripes is produced on the raster. As mentioned previously, this horizontal bar pattern is produced by the auxiliary deflection coils 26*a* and 26*b* being energized at a frequency which is a multiple of the vertical scanning rate. Under the conditions in which both the color purity rings and the deflection yoke are properly adjusted, there will appear a pattern of red bars separated by equal intensity alternating blue and green color bars. This pattern of equal intensity blue and green bars would be observed at all regions of the viewing screen. It is noted that for simplicity in illustrating and explaining the invention the color bars in FIGS. 7, 8 and 9 are shown to be separate red, green and blue bars of equal width. In practice, the green bars are actually red bars diluted by green as the beam in these positions lands mostly on red phosphor elements with only some clipping of the green phosphor elements. This situation is similar with the blue bars. The apparent width or intensity of the blue and green bars is determined by the peak to peak scanning current waveforms applied to auxiliary deflection coils 26*a* and 26*b*.

FIG. 8 illustrates a color purity error condition in the center of the screen which may be observed while adjusting color purity in accordance with the invention. While the purity rings are being adjusted, it may be observed that the horizontal blue color bars are of greater intensity than the green color bars as indicated by the double letters BB in FIG. 8. The blue color would appear much more dominant in the bar pattern and would be an objective indication to the operator that color purity was improperly adjusted in the center region of the viewing screen. Proper adjustment of the color purity rings would transform the pattern of FIG. 8 into that illustrated in FIG. 7.

FIG. 9 illustrates a condition of color purity error which may exist in the edge regions of the viewing screen 12 after the center region purity has been properly adjusted. The condition illustrated indicates that the green bars are more intense on the left-hand side of the raster and the blue bars are more intense at the right-hand side of the raster, as indicated by the double letters GG and BB. Again as in FIG. 8, the FIG. 9 pattern is an objective indication to the operator that the deflection yoke may be moved axially to correct for color purity. When the deflection yoke has been properly adjusted, the pattern of FIG. 9 will be transformed to the pattern illustrated in FIG. 7 with equal intensity green and blue color bars interleaved by the red color bars.

Figure 10:
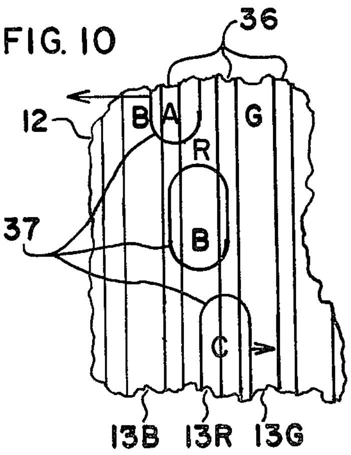
FIG. 10 illustrates three positions of an electron beam while adjusting purity utilizing the method and apparatus of the invention.

FIG. 10 illustrates three positions of the red electron beam portion 37 which occur while adjusting color purity in accordance with the invention. As was previously mentioned, the scanning current which may comprise a nominal square wave is AC coupled to the deflection coils. At one extreme polarity of the square wave scanning current the electron beam will be deflected to a position A to the left of center. Thus, the red beam will purposefully clip the blue color phosphor elements. At the other polarity of the auxiliary deflection current, the red electron beam portion 37 will be deflected to a position C on the faceplate where it will purposefully clip the green color phosphor elements. Between the two extremes of the square wave scanning current the red beam will not be deflected by the auxiliary deflection coils 26*a* and 26*b* and hence will land on the red phosphor element at position B.

Since the auxiliary vertical scanning rate is of a substantially lower frequency than the horizontal scanning rate, a series of different color horizontal bars will be produced by the combined magnetic fields of the auxiliary deflection coils and the conventional deflection coils of the yoke. That is, the red color beam 37 will form a horizontal bar of blue color to the left and right of position A, a red color bar to the left and right of position B, and a green color bar to the left and right of position C. This pattern is repeated from the top to the bottom of the raster formed on the viewing screen.

To maximize the effectiveness of the present invention, it may be desirable to adjust the peak to peak amplitude of the scanning current through auxiliary deflection coils 26*a* and 26*b*. This may be accomplished readily by simple amplitude adjustment within the amplifier 45 of FIG. 1. Specifically, the amplitude of the auxiliary scanning current is adjusted so that clearly defined blue and green color bars are produced. The auxiliary scanning coils may be of the general shape illustrated in FIGS. 1 and 2 and may comprise 100 turns of number 22 AWG wire. Such coils, when positioned approximately as shown in FIGS. 1 and 2, require a scanning current on the order of one ampere peak to peak to produce the desired horizontal bar pattern.

Since the auxiliary deflecting coils and the relatively simple conventional type circuitry utilized to energize them may be positioned in a test fixture such as illustrated in FIG. 1, use of the invention does not require any longer setup time than was required with the prior art test mounting of the picture tube. However, with the use of the invention the operator is able to perform the color purity adjustment in a more objective manner by virtue of the bar patterns and make this adjustment in less time than was previously required. The end result is that with a greater color purity tolerance setup by the adjustment of the color purity rings and deflection yoke utilizing the invention, the finished television receiver in the home of the consumer is less likely to develop color purity errors in the presence of such conditions as color picture tube temperature variations and the influence of stray magnetic fields.

What is claimed is:

1. A method of adjusting color purity of a multibeam color picture tube, comprising:
- placing a deflection yoke and color purity adjustment apparatus in operating positions relative to a color picture tube for causing a raster to be scanned on the viewing screen of said picture tube;
- placing a set of auxiliary deflection coils on opposite sides of said picture tube;
- energizing said auxiliary coils with scanning current for producing a bar pattern on said viewing screen;
- cutting off two of the three beams of said picture tube; and adjusting said color purity apparatus and the axial position of said deflection yoke for producing said bar patterns of a series of third color bars corresponding to said third beam interleaved by alternate equal intensity bars of first and second colors corresponding to the colors normally produced by said cutoff first and second beams.

2. A method of adjusting color purity of a color picture tube including an electron gun assembly for producing three horizontal coplanar beams and vertical phosphor stripes, comprising:
- mounting a deflection yoke and purity magnet assembly in operating relationship relative to said picture tube;
- energizing said deflection yoke for producing a raster on the viewing screen of said picture tube;
- biasing said electron gun for cutting off the two outside ones of said three coplanar beams;
- positioning a pair of auxiliary deflection coils relative to said picture tube and energizing them at a rate which is a multiple of the field deflection rate for producing a horizontal bar pattern on the viewing screen of said picture tube, said bar pattern comprising a repeating pattern of bars of a third color normally produced by said third beam interleaved by alternate first and second color bars of a color normally produced by said first and second cutoff beams; and
- adjusting said purity magnet assembly and the axial position of said deflection yoke for substantially equal intensities of said first and second colors on said viewing screen.

3. A system for setting up the color purity of a color picture tube, comprising:
- mounting means for holding a color picture tube and a color purity adjustment assembly and deflection yoke in operating relationship relative to said picture tube;
- means for biasing off two of the three beams produced by the electron gun assembly of said picture tube;
- means for energizing said deflection yoke at normal field and line deflection rates for scanning a raster with the third beam of said electron gun assembly on the viewing screen of said picture tube;
- a pair of auxiliary deflection coils mounted on said mounting means to be on opposite sides of said picture tube;
- means for energizing said auxiliary coils at a scanning rate which is a multiple of said field deflection rate for deflecting said third beam alternately to each side of its normal position for producing a bar pattern on said viewing screen of bars of the normal color produced by said third beam alternately interleaved by bars of the respective colors normally produced by said other two beams so that said color purity adjustment assembly and said deflection may be adjusted until equal intensities of said two colors representative of said other two beams are produced on said viewing screen.

4. A system according to claim 3 wherein said means for biasing enable the two non-central beams of said picture tube to be cut off.

5. A system according to claim 3 wherein said mounting means includes means for adjusting the axial position of said deflection yoke.

* * * * *